Nov. 21, 1939.    E. T. HERMANN    2,180,757
METHOD OF FORMING LIGHTWEIGHT FLUID PERVIOUS CERAMIC BODIES
Filed July 26, 1937    2 Sheets-Sheet 1
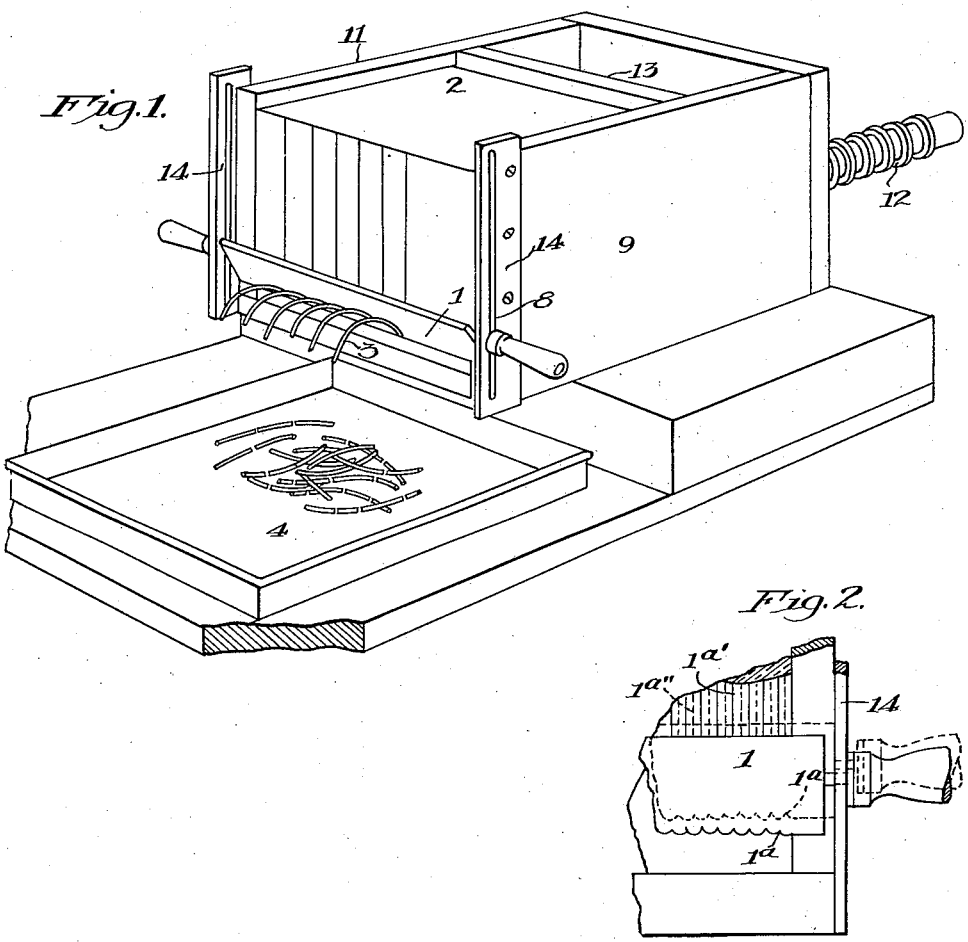
INVENTOR.
Ernest T. Hermann,
BY
ATTORNEYS.

Patented Nov. 21, 1939

2,180,757

UNITED STATES PATENT OFFICE 2,180,757

METHOD OF FORMING LIGHTWEIGHT FLUID PERVIOUS CERAMIC BODIES

Earnest T. Hermann, El Segundo, Calif.

Application July 26, 1937, Serial No. 155,745

4 Claims. (Cl. 25—156)

This invention relates to the production of light-weight, fluid pervious bodies and pertains particularly to the production of light-weight ceramic bodies adapted for use as refractory heat insulating materials.

This application is a continuation-in-part of my co-pending applications Serial Nos. 548,905 and 746,309 filed July 6, 1931 (issued July 27, 1937 as Patent No. 2,087,973) and October 1, 1934, respectively.

One of the principal objects of this invention is to produce a light-weight ceramic body in a rapid and economical manner without sacrifice of mechanical strength.

A further object of the invention is to provide for the production of light-weight ceramic bodies in a two step procedure involving the production of discrete ceramic particles and the subsequent interbonding of such discrete particles into an integral ceramic body through the agency of an external coating which is treated to produce a ceramic interbond of the particles.

A further object of the invention is to provide for the production of light-weight porous ceramic bodies of high mechanical strength in a process involving the preliminary production of prefired and preshrunk unitary particles adapted to form the major portion of the bulk of the finished body, and the subsequent ceramic interbonding of such particles into an integral ceramic body in a separate firing operation.

The process of the present invention comprises, essentially, the subdivision of a plastic or semiplastic body of highly refractory argillaceous material in the production of a mass of discrete argillaceous particles, the firing of such particles to a ceramic condition, the molding of a mass of such particles into a porous body in which the individual particles are plastically interbonded through a surface coating of argillaceous material, and the subsequent firing of such body to produce a vitreous bond in such surface coating.

Other objects of the invention will be brought out in the following specific description thereof, or will be apparent therefrom. Numerous forms of apparatus are available for the production of the desired discrete particles useful in the practice of this invention, and certain forms of such apparatus are illustrated in the accompanying drawings; referring thereto:

Fig. 1 is a perspective view of a form of shaving device which may be employed for the production of the discrete particles useful according to this invention;

Fig. 2 is a detail thereof showing a portion of the shaving blade and guide means;

Figure 3:
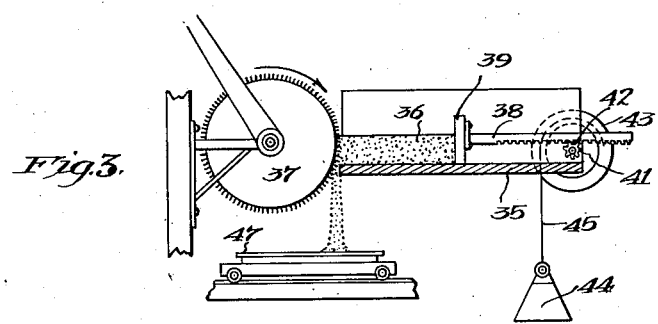
Fig. 3 is a partly broken-away side elevation of an alternative means which may be employed for the production of particles in the practice of this invention.

In the formation of high temperature insulating bodies, in particular, considerable difficulty has been experienced in securing the necessary porous structure along with the required resistance to spalling and heat fracture or disintegration. Numerous materials, or compositions of a ceramic nature, are available for the production of heat resisting bodies, but considerable difficulty has hitherto been experienced in the formation of such materials into the desired form, in view for example, of the shrinkage characteristics of such material exhibited during the drying and firing operations. It is highly desirable that a high temperature refractory body be so formed that it has been subjected to all the shrinkage which it would normally experience in actual use, so that the body will not undergo further shrinkage in such use. The method of the present invention provides primarily for the attainment of this desirable condition in an inexpensive and facile manner, while providing a high degree of porosity and thus inducing advantageous heat insulating characteristics.

Figs. 1 and 2 illustrate a form of apparatus adapted to produce filamentary particles of a plastic argillaceous material by a shaving operation, and referring thereto a shaving blade is indicated at 1, adapted for downward movement across the face of a soft, semiplastic mass of argillaceous material 2, in the production of a plurality of filaments 3 which fall downwardly into a suitable receptacle 4 after the manner shown. For the purpose of clarity but a few of the above filaments are delineated.

The shaving blade 1 may be slidably disposed within a guide slot 8 disposed on the side walls 9 of the material container 11. The material container 11 is provided with feed means such as a screw 12 acting on a backing plate 13 whereby the soft material is moved into position to be acted upon by the blade 1 upon operation of the screw 12 by suitable driving means not shown.

Fig. 2 shows a detail of one side of the shaving blade mounting. The shaving blade is slidably disposed within the slot 8 as above described and between guide plates 14 in such manner as to be laterally movable a distance of substantially onehalf the distance separating the shaving teeth 1a from each other. The respective ends of the blade 1 may be caused to come into alternative engagement with the respective guide plates 14 upon completion of such lateral movement to one side or the other, so that upon blade 1 being held to the extreme left (solid lines in Fig. 2) and a down cut being taken across the face of the material 2, filamentary shavings 3 will be removed along the lines shown at 1a', and upon the blade being returned to the top, moved laterally to the extreme right and a second down cut taken, as shown in dotted position in Fig. 2, filamentary shavings will be removed along the dotted lines shown at 1a". A third cut is taken like the first cut, a fourth cut like the second, and so on.

Figure 4:
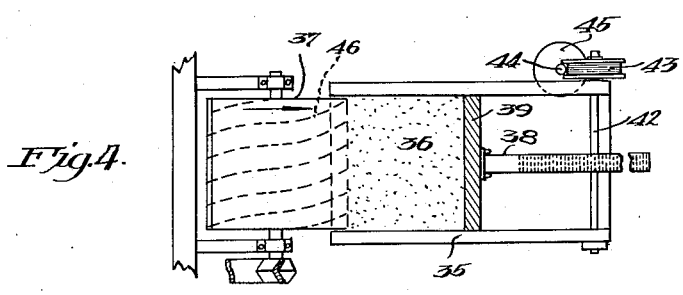
Fig. 4 is a plan view of the form of apparatus shown in Fig. 3.

The form of device illustrated in Figs. 3 and 4 may be used to form particles adapted to be shaped into a porous ceramic body according to the present invention, being particularly useful in treating a feebly plastic clay, or a clay in which a considerable percentage of grog has been incorporated, and may comprise a table 35 providing support for a body 36 of semiplastic argillaceous material. The body 36 may be pressed into contact with a cutting drum 37 by means of a rack 38 carrying a pressure plate at its forward end 39 and forced forwardly by a gear 41 secured to shaft 42 and drum 43 provided with a weight 44 and an attaching wire 45 which is wound around the drum 43 in such direction as to drive the rack 38 forwardly. The cutting drum 37 may comprise a wooden drum provided with a plurality of cutting teeth arranged in helically disposed rows 46, as shown in Fig. 4, each tooth being adapted to cut an individual particle away from the block 36. The particles formed by the engagement of the cutting teeth with the forward end of the block 36 may be allowed to fall into a suitable receptacle or the like as shown at 47.

As a specific example of the practice of the present invention, I may subject a mass of high alumina clay to subdivision in the formation of discrete particles, through the agency of any of the above-described forms of apparatus, in the formation of discrete particles of a particle size averaging about ⅛" in maximum dimension and from ⅛" to as little as 0.01" in minimum dimension. Where filamentary particles of considerable length are produced, it may be desirable to subject the same to a light crushing operation, either before or after firing, to cause a reduction in the length thereof, to come within the above disclosed preferred range of dimensions.

The argillaceous particles produced as above are then subjected to a rapid firing operation, preferably bringing the same to a temperature a few hundred degrees below the temperature to which the final body is to be subjected in use. For example, if the final refractory body is to be employed at a temperature approximating 2600° F., I may burn the discrete particles to a temperature in the neighborhood of 2300° F. In any event, the particles are fired to a temperature sufficient to produce a significant firing shrinkage in the particles, and preferably to a sufficient temperature to cause the major portion of the firing shrinkage to take place but insufficient to cause a bond between the particles. The fired particles are then allowed to cool in any suitable manner and are conveyed to storage. The pervious ceramic bodies are produced by taking a quantity of the above-described prefired and preshrunk particles, mixing the same with a plastic clay mixture such as a mixture of finely ground clay of the character employed to form the discrete particles, or of any other desired composition, with a suitable proportion of water, to produce a surface coating of plastic clay over the body of the discrete prefired particles. The coated prefired particles are then molded into block form according to any desired molding operation, in such manner as to secure a plastic interbond between the particles, and to arrange the particles in supportingly interconnecting relation to form a body having a multiplicity of internal voids. Such body is then subjected to a firing operation at a temperature above the temperature to which the discrete particles were fired, for example, to a temperature of approximately 2700° F. or a little higher to produce a vitreous bond in the coating and form an integral ceramic body.

It will be appreciated that the quantity and stiffness of the plastic argillaceous slip will be so selected as to coat the particles somewhat thinly, so that the slip material will not fill the intersticial voids between the prefired particles. It will be appreciated further that the "porosity" of the finished block may be controlled within certain limits by so selecting the thickness of the coat provided on the prefired particles, so that voids of the desired size and quantity are obtained.

The effects of porosity, size of voids, and the degree of continuity of the voids (permeability of the mass) are quite fully discussed in Principles of heat flow in porous insulators, by H. W. Russell (Journ. Amer. Ceramic Soc., vol. 18, No. 1, pp 1–5, January, 1935), and the principles therein disclosed may be utilized in preparing insulating bodies of desired properties in accordance with this invention.

When the discrete argillaceous particles are subjected to the preliminary firing operation to convert the same into discrete ceramic particles, most of the shrinkage will be out of the clay from which the particles were formed, so that the subsequent firing of a pervious body made of such particles will cause very little shrinkage. When the discrete ceramic particles are molded into block form in the formation of the pervious body, the individual particles are in substantial contact with one another throughout the body, with the surface coating of argillaceous slip material surrounding the particles and coating over the same at their points of contact, while leaving voids or spaces therebetween. The drying shrinkage which the slip material experiences as well as the firing shrinkage to which the coating is subjected in the main firing operation serves to compact the particles upon one another in the production of a very strong bond, without materially reducing the total volumetric size of the body.

The firing of the discrete particles to a somewhat lower temperature than the final firing temperature is of particular advantage in securing a better bonding power with the coating material than would be secured where the first and second firing temperatures are substantially equivalent. The reason for this is, in my opinion, that certain constituents of the particles which remain unfused during the first firing operation to the lower temperature become fluid and bond more firmly with the fused materials in the coating layer during the higher temperature firing operation, whereby a fluid bond between the particles and the coating material is actually produced in the second firing operation instead of merely producing a fluid bond within the coating material itself, in position surrounding the particles.

It will be appreciated that other forms of slicing or shaving devices may be employed to produce the discrete particles useful according to this invention. For example, reference is made to the devices shown in my copending application Serial No. 746,309 filed October 1, 1934. Similarly, the invention is not to be interpreted as limited to the specific procedural steps herein set forth, but rather to the scope of the subjoined claims.

I claim:

1. The method of forming light-weight fluid pervious ceramic bodies which comprises: subjecting a body of argillaceous material to plastic subdivision to produce discrete argillaceous particles; subjecting said particles to a firing operation at a temperature sufficient to shrink the same but insufficient to cause a bond between the particles; coating said fired particles with a plastic slip of argillaceous material; placing the coated particles in plastically interbonded and supportingly intercontacting relation to form a body provided with a multiplicity of internal voids; and firing said body at a temperature sufficient to produce a vitreous bond in said coating and cause formation of an integral ceramic body.

2. The method of forming light-weight fluid pervious ceramic bodies, which comprises: subjecting an argillaceous body to plastic subdivision to produce discrete argillaceous particles; subjecting said argillaceous particles to a firing operation at a temperature sufficient to produce a significant firing shrinkage in said particles but insufficient to cause a bond therebetween; coating said fired particles with a plastic slip of argillaceous material of ceramic properties similar to those of the material of said argillaceous body; placing the coated particles in plastically interbonded and supportingly intercontacting relation to form a body having a multiplicity of internal voids; and firing said body at a temperature in excess of the first-mentioned temperature to produce a vitreous bond in said coating and cause the formation of an integral ceramic body.

3. The method of manufacturing a ceramic pervious body which comprises shaving of agglomerate particles from a mass of plastic argillaceous material in such condition that said particles have no tendency to plasticly interbond on contact with each other, subjecting said particles to a heat treatment to cause each particle to develop an internal bond but insufficient to cause a bond between the particles, coating said fired particles with an aqueous medium containing an argillaceous bonding material so as to obtain plastic interbonding of the particles, forming said coated particles into a body having a high percentage of mutually intercommunicating voids and a multiplicity of internal surfaces defining said voids, said voids being open to free communication with the medium surrounding said body at the surface of said body, and then causing said particles to interbond to form an integral body by an application of heat sufficient to produce a vitreous bonding of said coating around said particles.

4. The method of manufacturing a ceramic pervious body which comprises shaving of agglomerate particles from a mass of plastic argillaceous material in such condition that said particles have no tendency to plasticly interbond on contact with each other, subjecting said particles to a heat treatment at a temperature sufficient to cause each particle to develop an internal bond and produce significant firing shrinkage in said particles but insufficient to cause a bond between the particles, coating said fired particles with an aqueous medium containing an argillaceous bonding material so as to obtain plastic interbonding of the particles, forming said coated particles into a body having a high percentage of mutually intercommunicating voids and a multiplicity of internal surfaces defining said voids, and then causing said particles to interbond to form an integral body by heat treatment thereof at a temperature in excess of said first-named temperature.

EARNEST T. HERMANN.